(12) United States Patent
Nishimura et al.

(10) Patent No.: US 7,353,783 B2
(45) Date of Patent: Apr. 8, 2008

(54) EXHAUST GAS RECIRCULATION DEVICE FOR ENGINE

(75) Inventors: Shinji Nishimura, Osaka (JP); Hiroki Masuda, Osaka (JP); Hiroyuki Fujii, Osaka (JP)

(73) Assignee: Yanmar Co., Ltd. (JP)

( * ) Notice: Subject to any disclaimer, the term of this patent is extended or adjusted under 35 U.S.C. 154(b) by 219 days.

(21) Appl. No.: 11/219,878

(22) Filed: Sep. 7, 2005

(65) Prior Publication Data

US 2007/0186899 A1 Aug. 16, 2007

Related U.S. Application Data

(63) Continuation of application No. PCT/JP2004/001951, filed on Feb. 19, 2004.

(30) Foreign Application Priority Data

Mar. 11, 2003 (JP) ............................... 2003-65289

(51) Int. Cl.
*F02F 1/36* (2006.01)
*F02B 47/08* (2006.01)

(52) U.S. Cl. ........................ 123/41.82 R; 123/568.11; 123/568.14

(58) Field of Classification Search ......... 123/41.82 R, 123/193.5, 568.11, 568.14

See application file for complete search history.

(56) References Cited

U.S. PATENT DOCUMENTS 2,124,081 A * 7/1938 Rauen et al. ............... 123/323
5,421,292 A * 6/1995 Hoffman et al. ......... 123/193.5

FOREIGN PATENT DOCUMENTS

JP 52-24622 2/1977

(Continued)

OTHER PUBLICATIONS

Microfilm of the specification and drawings annexed to the request of Japanese Utility Model Application No. 16693/1980 (Laid-Open No. 118949/1981), Yanmar Diesel Engine Co., Ltd., Sep. 10, 1981.

(Continued)

*Primary Examiner*—Noah P. Kamen
(74) *Attorney, Agent, or Firm*—Sterne, Kessler, Goldstein & Fox P.L.L.C.

(57) ABSTRACT

An exhaust gas recirculation device for an engine having a cylinder head with a suction port and an exhaust port, provided with a mechanism for recirculating a portion of exhaust gas to the suction side of the cylinder head, comprises a connection hole is opened through a wall of the cylinder head disposed between the suction port and the exhaust port. The connection hole is bored vertically slantwise. The connection hole at the suction side is opened along the direction of swirls of sucked air. A throttle is disposed in at least either a suction flow passage communicating with the suction port or an exhaust flow passage communicating with the exhaust port so that the opening area of the suction flow passage or the exhaust flow passage can be adjusted by the throttle.

12 Claims, 16 Drawing Sheets

FOREIGN PATENT DOCUMENTS

| JP | 52-127514 | 10/1977 | |
|----|-----------|---------|---|
| JP | 57-16251 | 1/1982 | |
| JP | 59-25877 | 6/1984 | |
| JP | 61025962 A * | 2/1986 | ............ 123/568.29 |
| JP | 05-018323 | 1/1993 | |
| JP | 2003-27966 | 1/2003 | |

OTHER PUBLICATIONS

Microfilm of the specification and drawings annexed to the request of Japanese Utility Model Application No. 119252/1988 (Laid-Open No. 40961/1990), Nissan Diesel Motor Co., Ltd., Mar. 20, 1990.

Microfilm of the specification and drawings annexed to the request of Japanese Utility Model Application No. 57397/1971 (Laid-Open No. 16224/1973), Daihatsu Motor Co., Ltd., Feb. 23, 1973.

Microfilm of the specification and drawings annexed to the request of Japanese Utility Model Application No. 63023/1981 (Laid-Open No. 176639/1982), Isuzu Motors Ltd., Nov. 8, 1982.

First page of WO 2004/081363, Sep. 23, 2004, Nishimura et al.

International Search Report for PCT/JP2004/001951, mailed Jun. 1, 2004.

Form PCT/IB/308 for PCT/JP2004/001951, mailed Oct. 14, 2004.

* cited by examiner (a)

(b)

EXHAUST GAS RECIRCULATION DEVICE FOR ENGINE

CROSS-REFERENCE TO RELATED APPLICATION

The present application is a Continuation of PCT Application No. PCT/JP2004/001951, filed Feb. 19, 2004, which is hereby incorporated in its entirety herein by reference thereto.

BACKGROUND OF THE INVENTION

1. Field of the Invention

The invention relates to an exhaust gas recirculation device for an engine, provided with a mechanism for recirculating a portion of exhaust gas to the suction side of the engine.

2. Background Art

Conventionally, there is a well-known exhaust gas recirculation device (hereinafter, "EGR") for an engine, which is provided with a mechanism connecting an exhaust flow passage to a suction flow passage so as to recirculate exhaust gas to the suction side of the engine. The EGR mechanism recirculates a portion of gas exhausted from the engine to the suction flow passage so as to reduce the temperature of combusted gas in the cylinder, thereby reducing NOx.

To construct the EGR mechanism, as disclosed Japanese Laid-open Gazette No.

Hei 5-18323, for instance, an EGR passage is formed between the suction flow passage and the exhaust flow passage so that the exhaust flow passage communicates to the suction flow passage via the EGR passage so as to recirculate exhaust gas.

However, in this recirculation device for an engine, the EGR mechanism is complicated and expensive because the EGR mechanism is a pipe disposed between the suction flow passage and the exhaust flow passage.

BRIEF SUMMARY OF THE INVENTION

According to the present invention, an exhaust gas recirculation device for an engine having a cylinder head with a suction port and an exhaust port, provided with a mechanism for recirculating a portion of exhaust gas to the suction side of the cylinder head, comprises a connection hole is opened through a wall of the cylinder head disposed between the suction port and the exhaust port. The connection hole simplifies the EGR mechanism such as to restrain increase of temperature for combustion of gas and to reduce NOx. Further, since the EGR passage can be integrated with the cylinder head, no piping for recirculation of exhaust gas is required, thereby reducing costs.

Further, according to the present invention, the connection hole is bored vertically slantwise. Therefore, the connection hole can be easily bored from a hole (the exhaust port) communicating with the exhaust manifold.

According to the present invention, the connection hole at the suction side is opened along the direction of swirls of sucked air. Therefore, while the exhaust gas is introduced into a cylinder from the opening of the connection hole at the suction side via the suction port, the exhaust gas does not disturb the swirls but promotes the swirls, whereby the recirculated exhaust gas can be mixed with air introduced from an air cleaner, thereby reducing NOx.

According to the present invention, a throttle is disposed in a suction flow passage communicating with the suction port so that the opening area of the suction flow passage can be adjusted by the throttle. Therefore, the EGR rate can be changed by the throttle.

When the engine is driven at high speed or with heavy load, the throttle is adjusted to reduce the EGR rate for increasing introduction of the outside air, thereby reducing NOx.

Further, according to the present invention, the throttle in the suction flow passage is operatively connected to a control lever of a fuel injection pump for adjusting the amount of injected fuel. Therefore, the throttle is automatically shifted to be closed for increasing the EGR rate during low speed drive, and to be opened for reducing the EGR rate during high speed drive, thereby reducing NOx. A link may be used for connecting the throttle to the control lever so as to ensure a simple linkage. The linkage may be provided with a variable length mechanism for adjusting the timing for controlling the amount of recirculated exhaust gas. Further, the EGR rate can be controlled to a value nearly synchronous to engine action.

Alternatively, according to the present invention, the throttle in the suction flow passage is operatively connected to a regulator. Therefore, the throttle is automatically shifted to be closed for increasing the EGR rate during low speed setting, and to be opened for reducing the EGR rate during high speed setting, so as to reduce NOx while keeping desirable engine performance. A simple link may be used so as to constitute a simple linkage for connecting the throttle to the regulator.

Alternatively, according to the present invention, the throttle in the suction flow passage is operatively connected to a thermo-sensing expansive member which is expanded and contracted in correspondence to engine temperature. Therefore, according to temperature variation of the engine itself, the throttle is automatically shifted to be closed for increasing the EGR rate in a low temperature, and to be opened for reducing the EGR rate in a high temperature, so as to reduce NOx while keeping desirable engine performance.

Alternatively, according to the present invention, a throttle is disposed in an exhaust flow passage communicating with the exhaust port so that the opening area of the exhaust flow passage can be adjusted by the throttle. Therefore, the EGR rate can be changed by the throttle. When the engine is driven at high speed or with heavy load, the throttle is adjusted to reduce the EGR rate for increasing introduction of the outside air, thereby reducing NOx.

Further, according to the present invention, the throttle in the exhaust flow passage is operatively connected to a control lever of a fuel injection pump for adjusting the amount of injected fuel. Therefore, the throttle is automatically shifted to be closed for increasing the EGR rate during low speed drive, and to be opened for reducing the EGR rate during high speed drive, thereby reducing NOx. A link may be used for connecting the throttle to the control lever so as to ensure a simple linkage. The linkage may be provided with a variable length mechanism for adjusting the timing for controlling the amount of recirculated exhaust gas. Further, the EGR rate can be controlled to a value nearly synchronous to engine action.

Alternatively, according to the present invention, the throttle in the exhaust flow passage is operatively connected to a regulator. Therefore, the throttle is automatically shifted to be closed for increasing the EGR rate during low speed setting, and to be opened for reducing the EGR rate during high speed setting, so as to reduce NOx while keeping desirable engine performance. A simple link may be used so as to constitute a simple linkage for connecting the throttle to the regulator.

Alternatively, according to the present invention, the throttle in the exhaust flow passage is operatively connected to a thermo-sensing expansive member which is expanded and contracted in correspondence to engine temperature. Therefore, according to temperature variation of the engine itself, the throttle is automatically shifted to be closed for increasing the EGR rate in a low temperature, and to be opened for reducing the EGR rate in a high temperature, so as to reduce NOx while keeping desirable engine performance.

According to the present invention, the connection hole has a portion at the suction side and a portion at the exhaust side which have diameters that are different from each other. Therefore, the connection hole is prevented from being clogged with accumulated carbon.

According to the present invention, opened-and-closed means is disposed in an intermediate portion of the connection hole so as to adjust the opening area of the connection hole. Therefore, the opened-and-closed means adjusts the amount of recirculated exhaust gas flowing in the connection hole so as to change the EGR rate. Accordingly, when the engine is driven at high speed or with heavy load, the throttle is adjusted to reduce the EGR rate for increasing introduction of the outside air, thereby reducing NOx.

BRIEF DESCRIPTION OF THE DRAWINGS/FIGURES

DETAILED DESCRIPTION OF THE INVENTION

At first, an entire configuration of an engine according to the present invention will be described.

Figure 1:
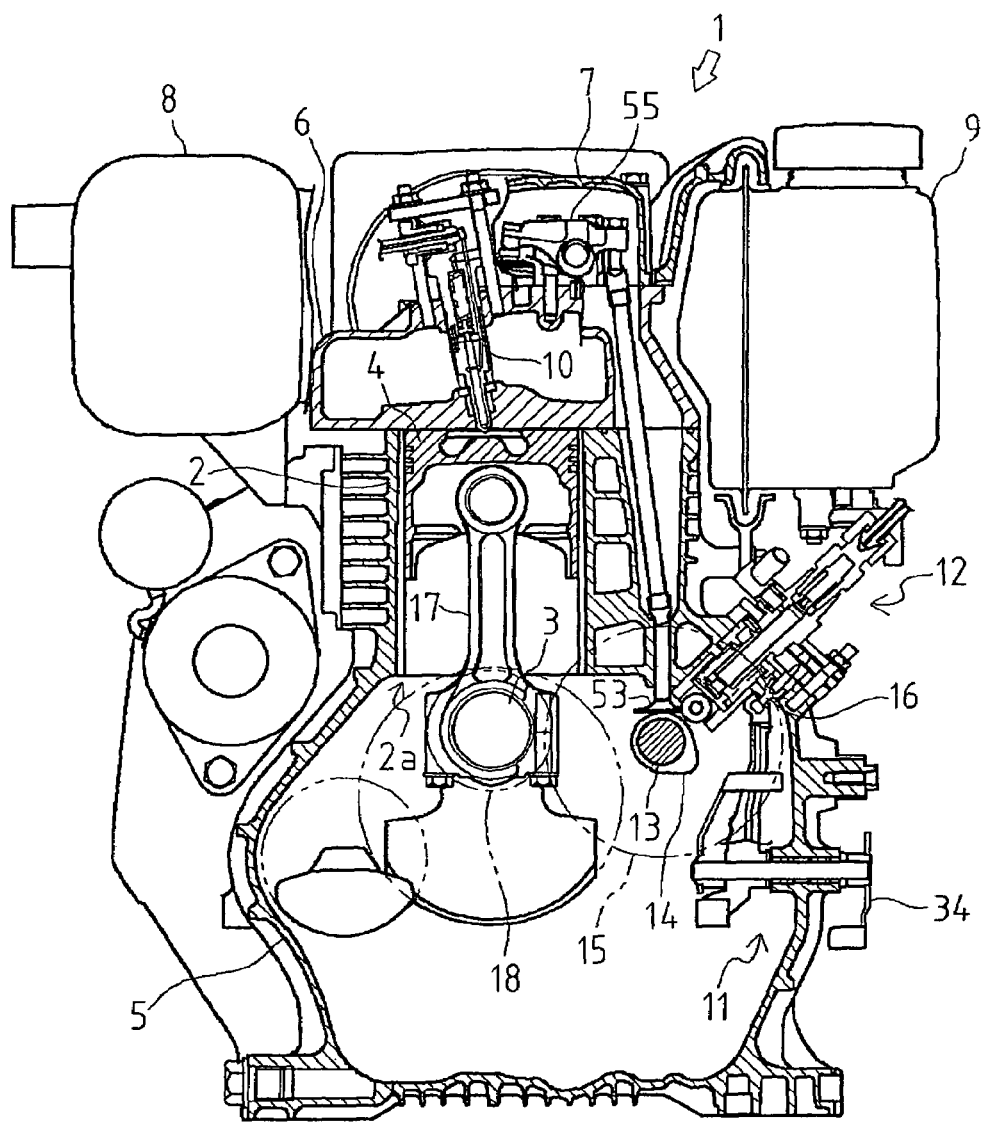
FIG. 1 is a sectional front view of an engine according to the present invention.

As shown in FIG. 1, an engine 1 has a main body consisting of an upper cylinder block 2 and a lower crankcase 5. A vertical cylinder 2a is formed in a central portion of cylinder block 2, and a piston 4 is disposed in cylinder 2a. A fore-and-aft crankshaft 3 is journalled in crankcase 5, and connected to piston 4 via a connection rod 17.

A cylinder head 6 is disposed above cylinder block 2, and a bonnet cover 7 is disposed above cylinder head 6 so as to provide a rocker arm chamber therein. At an upper portion of the engine, a muffler 8 is disposed on one side (left side in FIG. 1) of cylinder head 6, and a fuel tank 9 is disposed on the other side (right side in FIG. 1) of cylinder head 6.

In crankcase 5 at the lower portion of cylinder block 2 are disposed balance weights, a governor 11 and the like, and disposed a camshaft 13, a fuel injection pump 12 and the like above governor 11. A pump drive cam 14 is provided on the fore-and-aft middle portion of camshaft 13. Fuel injection pump 12 is configured so that its plunger is reciprocated by rotation driving of pump drive cam 14 so as to suck fuel from fuel tank 9 and supply a certain quantity of fuel to a fuel injection nozzle 10 via a high-pressure pipe at a certain timing. Fuel injection pump 12 has a control lever 16 which is rotated to control the efficient stroke of the plunger, thereby adjusting the amount of fuel injected from fuel injection nozzle 10.

Figure 3:
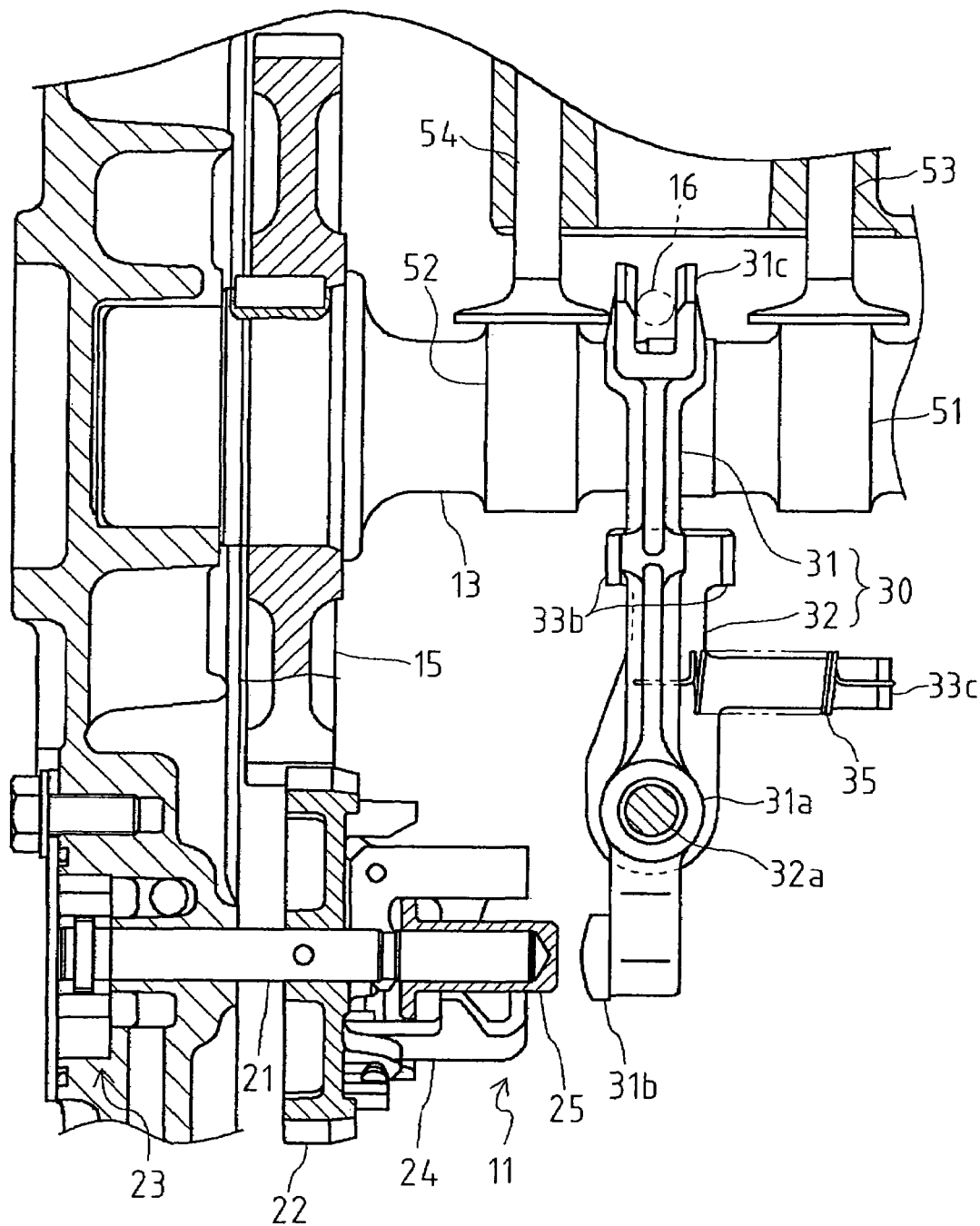
FIG. 3 is a sectional side view of a governor portion.

Camshaft 13 is journalled in crankcase 5 in parallel to crankshaft 3, and has an end, on which a gear 15 is fixed. Gear 15 meshes with a gear 18 fixed on crankshaft 3, and with a governor gear 22 fixed on a governor shaft 21, as shown in FIG. 3. In this way, the driving force is transmitted from crankshaft 3 to camshaft 13 via gears 18 and 15, and transmitted from camshaft 13 to governor shaft 21 via cam gear 15 and governor gear 22.

Governor shaft 21 is journalled in crankcase 5 in parallel to camshaft 13 and below camshaft 13. Governor gear 22 is fixed on the fore-and-aft middle portion of governor shaft 21. A lube pump 23 is provided on one end portion of governor shaft 21 toward crankcase 5 (front end portion), and governor 11 is disposed on the other end portion (rear end portion) of governor shaft 21.

As shown in FIG. 3, governor 11 has a governor weight 24, a governor lever 30. Governor weight 24 is pivoted at an intermediate portion thereof onto governor gear 22 via a pin, so as to be opened at one end thereof by increasing the rotary speed of governor shaft 21. Governor weight 24 engages at the other end thereof with a sleeve 25. Sleeve 25 is slidably fitted on governor shaft 21, and has a tip abutting against a contact portion 31b of governor lever 30.

Figure 4:
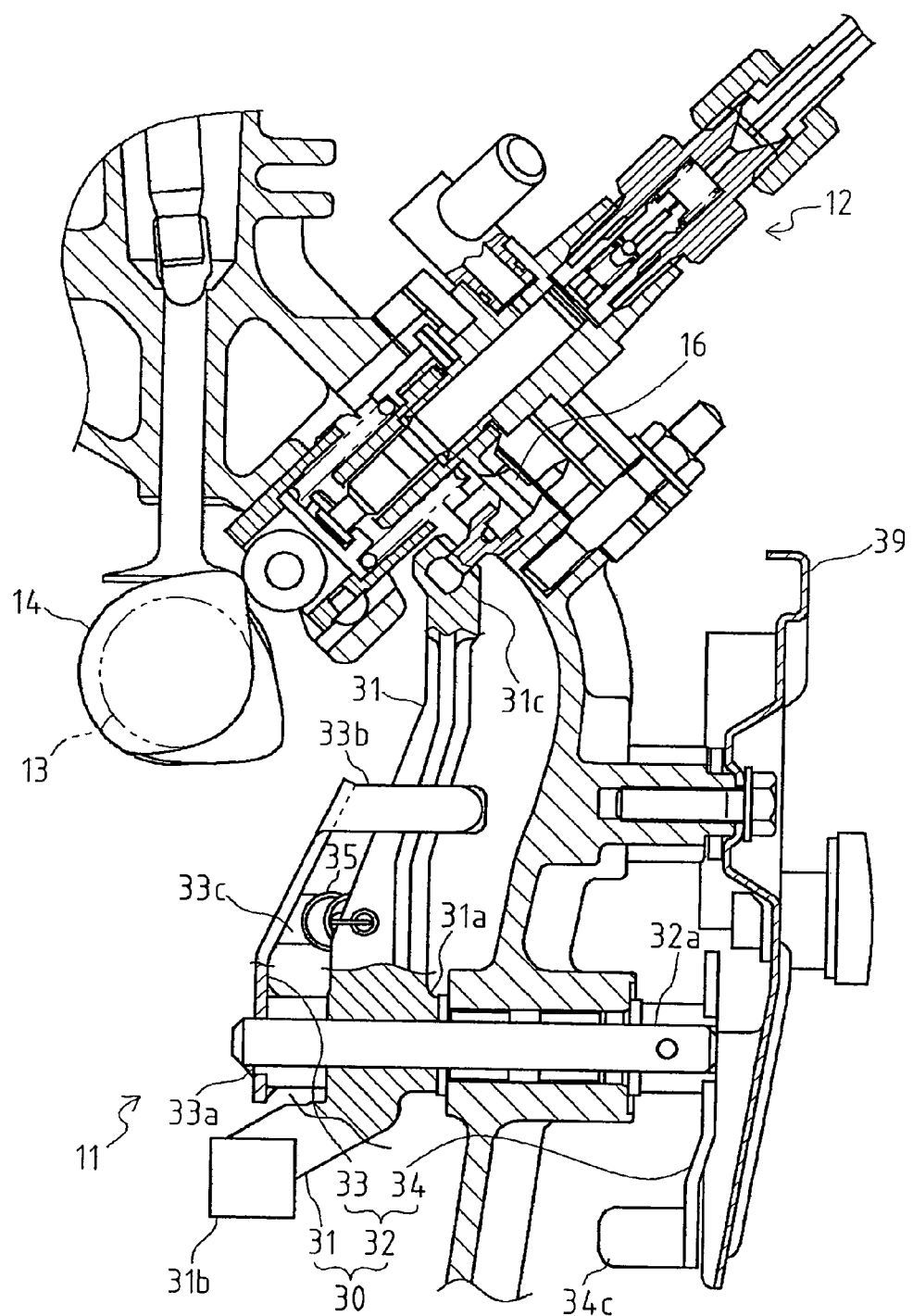
FIG. 4 is a sectional view of a governor lever portion.

As shown in FIGS. 3 and 4, governor lever 30 has a first rotary member 31 and a second rotary member 32. First rotary member 31 is formed at an intermediate portion thereof with a boss portion 31a, pivoted on a connection shaft 32a of second rotary member 32. Contact portion 31b projects on one end (lower end) of first rotary member 31 so as to abut against sleeve 25. A bifurcated engage portion 31c is formed on the other end (upper end) of first rotary member 31, so as to engage with one end of control lever 16.

In such a linkage configuration between governor 11 and fuel injection pump 12, as the rotary speed of crankshaft 3 increases, the rotary speed of governor shaft 21 increases so as to open governor weight 24 by centrifugal force as large as the increase of rotary speed of governor shaft 21, thereby pushing and sliding sleeve 25. Due to the slide of sleeve 25, first rotary member 31 rotates to rotate control lever 16 so as to reduce the amount of injected fuel for controlling the rotary speed of crankshaft 3 to the set rotary speed. On the contrary, when the rotary speed of crankshaft 3 is reduced, governor weight 24 is closed to rotate control lever 16 in the opposite direction, so as to increase the amount of injected fuel for controlling the rotary speed of crankshaft 3 to the set rotary speed. In this regard, the setting of rotary speed of crankshaft 3 depends on rotation of a later-discussed regulator 39.

Second rotary member 32 is provided with a restriction arm 33 and a control lever 34. Restriction arm 33 disposed in crankcase 5 and control lever 34 disposed outside crankcase 5 are integrally connected to each other through connection shaft 32a. Restriction arm 33 is integrally formed at one end thereof with a boss portion 33a, which is fixed on the inner end of connection shaft 32a. Restriction arm 33 is bent at the other end thereof in a U-like shape when viewed in plan, so as to form restriction portions 33b, which can fit first rotary member 31 for restricting the rotation of first rotary member 31 within a predetermined range. Retaining portion 33c projects sideward from an intermediate portion of restriction arm 33, and a spring 35 is interposed between retaining portion 33c and first rotary member 31 so as to bias first rotary member 31 to abut against one side of restriction portion 33b.

Figure 2:
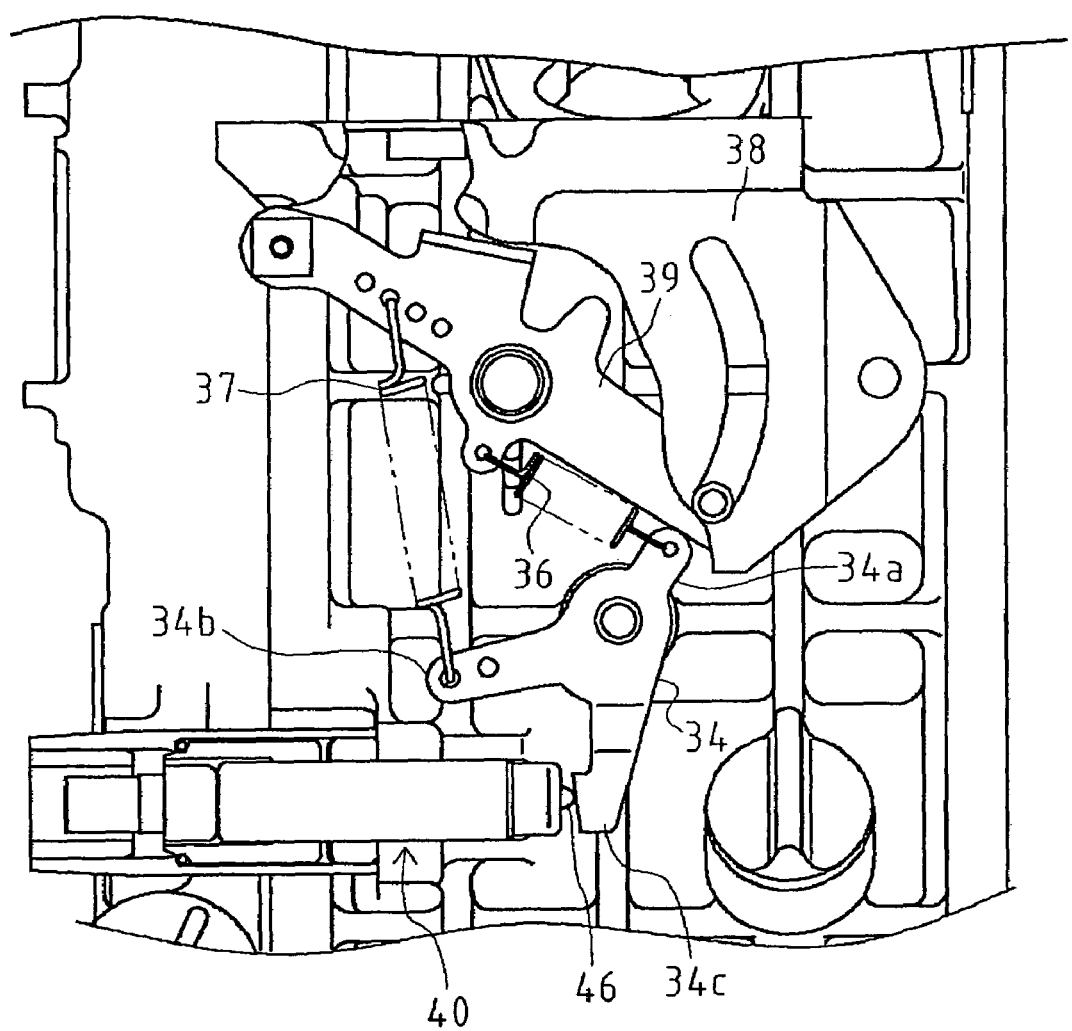
FIG. 2 is a side view of the engine according to the present invention.

As shown in FIGS. 2 and 4, control lever 34 is fixed on the outer end of connection shaft 32a outside the main body of engine 1. Control lever 34 has a central portion fixed on connection shaft 32a, and has three arms 34a, 34b and 34c radially projecting from the central portion. First arm 34a and second arm 34b are connected to regulator 39 via respective springs 36 and 37, and third arm 34c abuts against a tip of a slide shaft 46 of thermo-sensing expansive member 40 serving as a limiter. Regulator 39 is provided for setting the rotary speed of engine 1, and for stopping engine 1. Regulator 39 is so configured as to be rotated along a lever guide 38 and held at an optional rotary position. Thermo-sensing expansive member 40 is detachably and positionally adjustably attached onto a side surface of the main body of engine 1 so as to restrict rotation of governor lever 30 in correspondence to the increase of temperature of engine 1.

In this configuration, during start of engine 1 or in another case where engine 1 is unwarmed, thermo-sensing material in thermo-sensing expansive member 40 is out of expansion. In this case, control lever 34 of second rotary member 32 is pulled by spring 37 to abut against a tip of a second slide shaft 46 of thermo-sensing expansive member 40. Since centrifugal force is not applied on governor weight 24 because of the low rotary speed of engine 1, first rotary member 31 is pulled by spring 35 to rotate so that contact portion 31b of first rotary member 31 abuts against the tip of sleeve 25, and engage portion 31c of first rotary member 31 rotates control lever 16 for increasing injected fuel.

Here, first rotary member 31 is disposed between restriction portions 33b and 33b so as to be rotatable within the range defined by restriction portions 33b. More specifically, when the engine starts, due to rotation of regulator 39, the amount of supplied fuel is set. Simultaneously, due to the rotation of regulator 39, control lever 34 of second rotary member 32 is rotated via springs 36 and 37, i.e., the rotation of control lever 34 is set. The rotation of first rotary member 31 is restricted by restriction portions 33b and 33b of second rotary member 32 based on the rotation setting of control lever 34.

After the engine start, engine 1 is warmed to expand the thermo-sensing material in thermo-sensing expansive member 40, so that slide shaft 46 moves to a certain degree so as to push arm 34c of control lever 34, thereby rotating second rotary member 32 for reducing injected fuel. Due to the rotation of arm 34c, restriction arm 33 connected to arm 34c via connection shaft 32a also rotates with restriction portion 33b abutting against the side surface of first rotary member 31, whereby first rotary member 31 rotates together with restriction arm 33 to reduce injected fuel.

In this way, the thermo-sensing material serving as the limiter detects whether the temperature of warmed engine 1 reaches the predetermined value. Thermo-sensing expansive member 40 is set so that, when started engine 1 is cold, the amount of injected fuel is increased larger than the normal value, and so that, as engine 1 is warmed, the thermo-sensing material is expanded so as to reduce the amount of injected fuel. If the temperature of the warmed engine reaches or exceeds the predetermined temperature, the projection amount of the slide shaft of thermo-sensing expansive member 40 is limited due to the structure of the slide shaft itself and the slide limiter, thereby reducing the amount of injected fuel by the predetermined amount so as to drive the engine in the normal condition.

Figure 5:
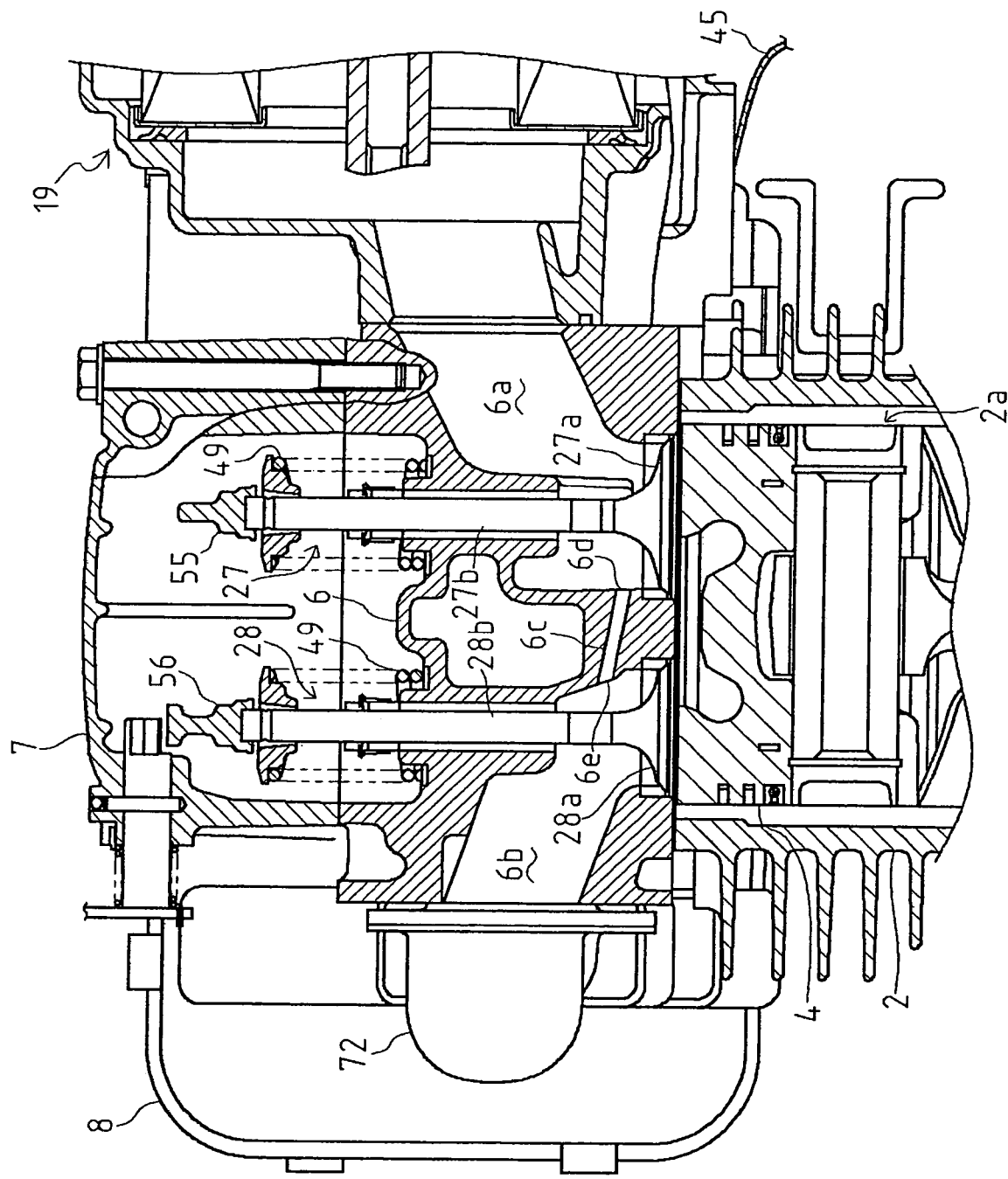
FIG. 5 is a sectional side view of an upper portion of the engine.

Further, as shown in FIG. 3, camshaft 13 is formed on intermediate portions thereof with an air suction cam 51 and an air exhaust cam 52 with a certain space therebetween, and pump drive cam 14 is disposed between suction and exhaust cams 51 and 52. Tappets 53 and 54 abut against suction and exhaust cams 51 and 52, and connected to lower ends of an air suction pushrod and an air exhaust pushrod, respectively. On the other hand, the air suction pushrod and the air exhaust pushrod are extended into the rocker arm chamber in bonnet cover 7 through respective vertical rod holes between cylinder block 2 and cylinder head 6. Each of rocker arms 55 and 56 has one side lower end against which each of the top ends of the air suction pushrod and the air exhaust pushrod abut, and as shown in FIG. 5, each of rocker arms 55 and 56 has the other side lower end against which each of the top ends of air suction valve 27 and air exhaust valve 28.

Air suction valve 27 (air exhaust valve 28) is formed at the bottom portion thereof with a valve head 27a (28a), and at a middle portion thereof with a valve rod 27b (28b), so as to be disposed above piston 4. Valve head 27a (28a) can be fitted or separated on and from a valve seat formed on the lower surface of cylinder head 6, so as to communicate or separate suction port 6a (exhaust port 6b) formed in cylinder head 6 to and from the combustion chamber of cylinder 2a formed in cylinder block 2. Suction port 6a is communicated to an air cleaner 19 disposed on one side surface (rear surface) of cylinder head 6, and exhaust port 6b is communicated to muffler 8 via an exhaust manifold 72.

Valve rod 27b (28b) is slidably extended upward through cylinder head 6 into bonnet cover 7, and abuts at the top end thereof against rocker arm 55 (56). In the rocker arm chamber, valve rod 27b (28b) is provided therearound with a spring 49 (49) to be biased upward so as to close air suction valve 27 (air exhaust valve 28).

Therefore, air suction cam 51 and air exhaust cam 52 on camshaft 13, when receiving the rotation force of crankshaft 3 via gears 18 and 15, rotate to lift up and down tappets 53 and 54. By the lifting of tappets 53 and 54, air suction valve 27 and air exhaust valve 28 are vertically slid to be opened and closed via the pushrods and rocker arms 55 and 56. Namely, air suction valve 27 and air exhaust valve 28 are opened and closed in connection with the rotation of air suction cam 51 and air exhaust cam 52 on camshaft 13.

Fuel injection nozzle 10 is disposed between air suction valve 27 and air exhaust valve 28. Fuel injection nozzle 10 is extended downward through cylinder head 6, so as to have a tip portion (injection port) disposed above the center of cylinder 2a, thereby injecting fuel supplied from fuel injection pump 12 into cylinder 2a.

Suction port 6a is a connection hole formed in cylinder head 6 and communicating with air cleaner 19 so as to send air into cylinder 2a. Therefore, a portion of air sucked into a fan case 45 is introduced to suction port 6a via air cleaner 19 by a fan disposed below air cleaner 19.

Figure 6:
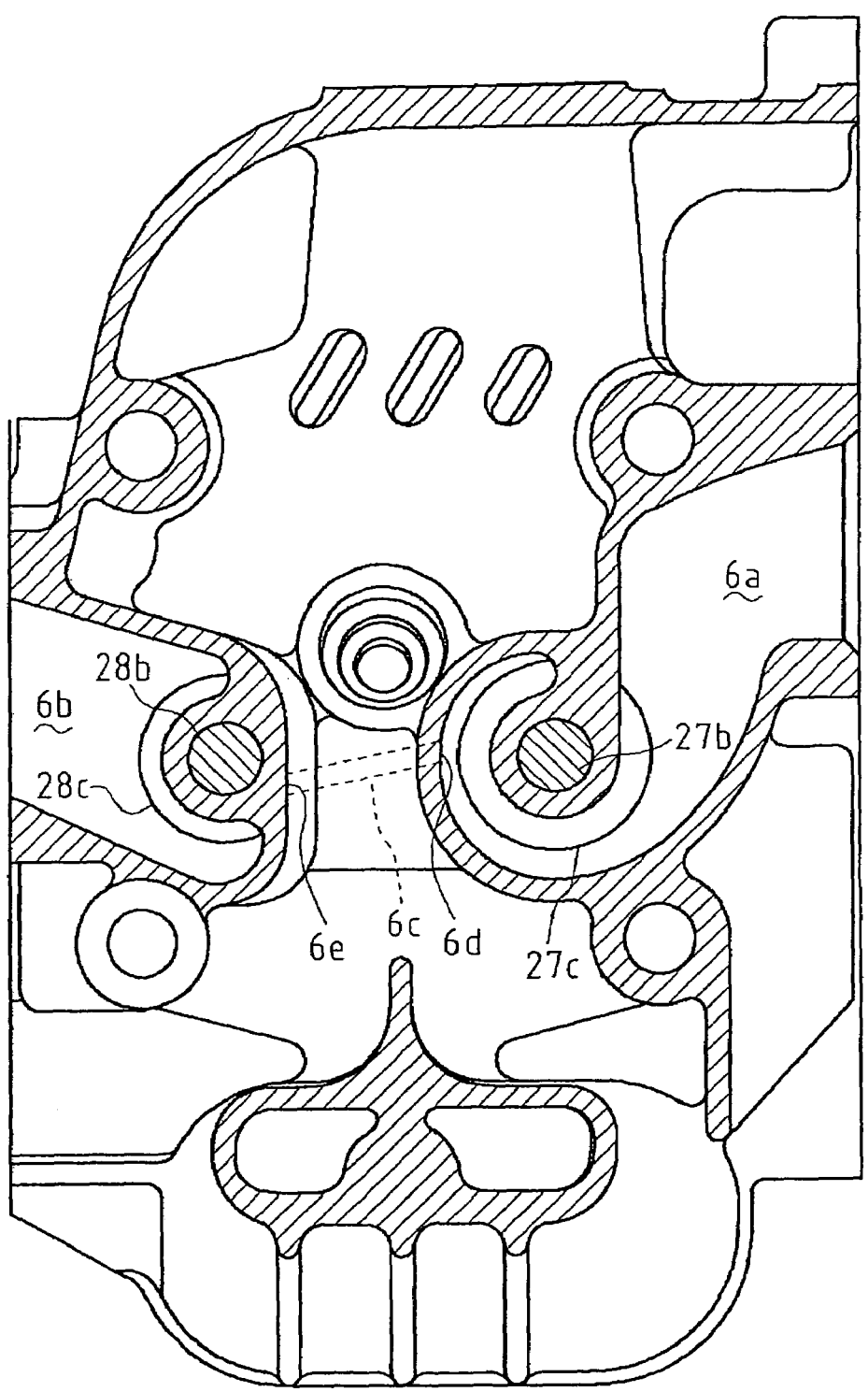
FIG. 6 is a sectional plan view of a cylinder head.

As shown in FIGS. 5 and 6, a connection hole 6c serving as an EGR passage is bored through a wall between suction port 6a and exhaust port 6b of cylinder head 6.

Connection hole 6c is opened at the substantially central portion of cylinder head 6 when viewed in plan. Therefore, a portion of exhaust gas exhausted from air exhaust valve hole 28c to exhaust port 6b can be recirculated to suction port 6a so as to constitute an exhaust gas recirculation (EGR) mechanism.

Connection hole 6c is bored in cylinder head 6 vertically slantwise when viewed in front so as to be easily bored from a hole (exhaust port 6b) communicating with exhaust manifold 72. In this embodiment, connection hole 6c is bored slantwise in cylinder head 6 so as to have an opening 6d on the air suction side and an opening 6e on the air exhaust side, wherein opening 6e is higher than opening 6d.

Therefore, the EGR mechanism, which suppresses increase of the temperature of combusted gas so as to reduce Nox, can be simplified. The EGR passage can be integrated with the cylinder head, thereby requiring no pipe for recirculating exhaust gas and saving costs.

Connection hole 6c may be bored to have the shortest distance between centers of air suction valve 27 and air exhaust valve 28 when viewed in plan. However, in this embodiment, connection hole 6c having opening 6d on the suction side and opening 6e on the exhaust side is bored in cylinder head 6 so as to horizontally offset openings 6d and 6e from each other, as shown in FIG. 6. In other words, connection hole 6c is bored in cylinder head 6 slantwise from a phantom line between centers of air suction valve 27 and air exhaust valve 28 (to cross the phantom line).

In this way, opening 6d of connection hole 6c on the suction side is opened in the direction along the swirl of air flowing from air suction valve 27c into cylinder 2a.

Namely, opening 6d of connection hole 6c on the exhaust side is opened so as to have the centerline of connection hole 6c disposed on the substantially tangent direction of air suction valve hole 27c. Therefore, when exhaust gas in exhaust port 6b flows from opening 6d of connection hole 6c on the suction side into cylinder 2a through suction port 6a, the recirculated exhaust gas flows along the swirl direction so as not to disturb the swirl but to promote the swirl, thereby being mixed with the suctioned air from the air cleaner 19, and thereby reducing Nox.

Figure 14:
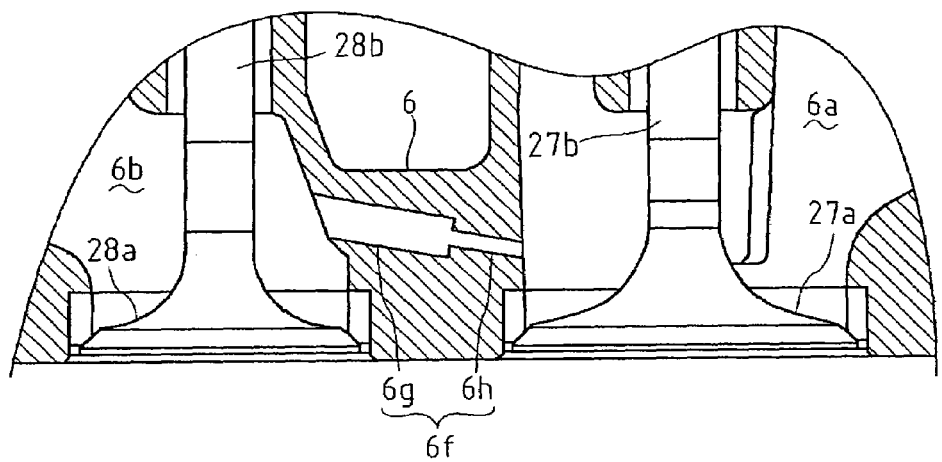
FIG. 14(a) is sectional side view of the shape of an alternative connection hole having a diametrically large portion serving as a passage on the exhaust side.
FIG. 14(b) is sectional side view of the shape of an alternative connection hole having a diametrically large portion serving as a passage on the suction side.
Figure 14:
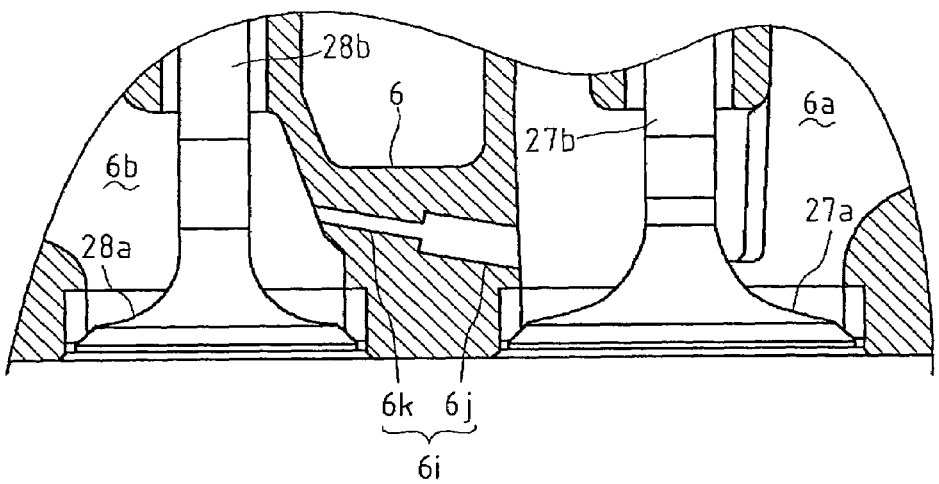

Alternatively, a connection hole 6f as shown in FIG. 14(a) or a connection hole 6i as shown in FIG. 14(b) may replace the connection hole 6c serving as the EGR passage.

In the connection hole 6f, a portion 6g on the exhaust gas side is diametrically larger than a portion 6h on the suction gas side. In the connection hole 6i, a portion 6j on the air suction side is diametrically larger than a portion 6k on the air exhaust side. Due to the diametrical difference of each of connection holes 6f and 6i, the diametrically smaller portion accelerates the flow of gas therethrough so as to reduce carbon stuck thereon, thereby preventing connection holes 6f and 6i from being clogged with carbon.

Preferably, the diametrically smaller portions of connection holes 6f and 6i are as axially short as possible so as to reduce the clogging.

Figure 15:
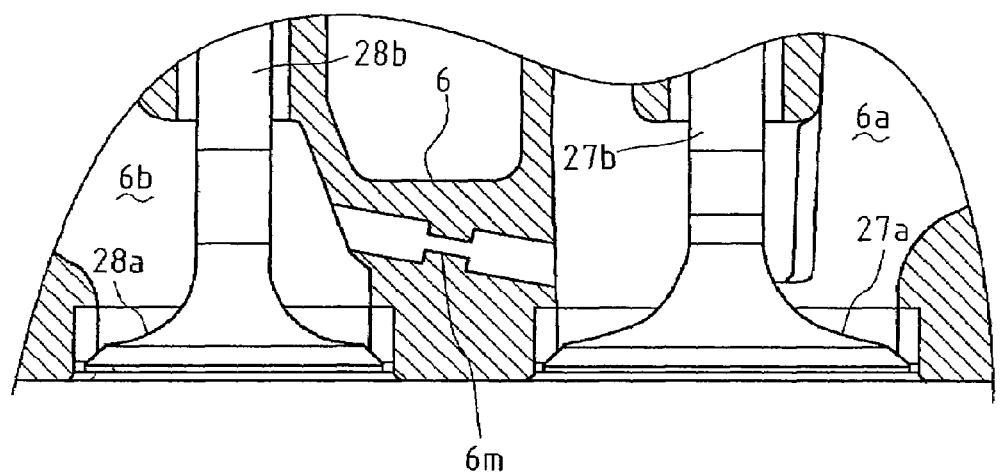
FIG. 15 is sectional side view of an alternative connection hole.
Figure 16:
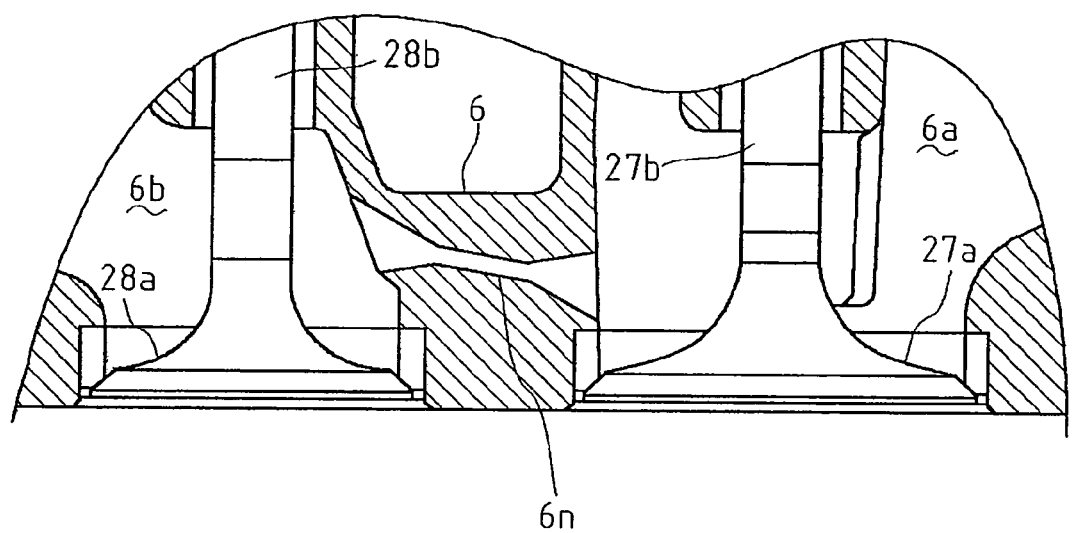
FIG. 16 is sectional side view of an alternative connection hole.

Alternatively, a connection hole 6m is narrowed at an intermediate portion thereof so as to serve as an orifice, as shown in FIG. 15. Alternatively, a connection hole 6n has both tapered ends and a narrowed axially intermediate portion. Such connection holes 6m and 6n are prevented from being clogged with carbon.

A linkage of the EGR mechanism for changing EGR rate will be described.

Figure 7:
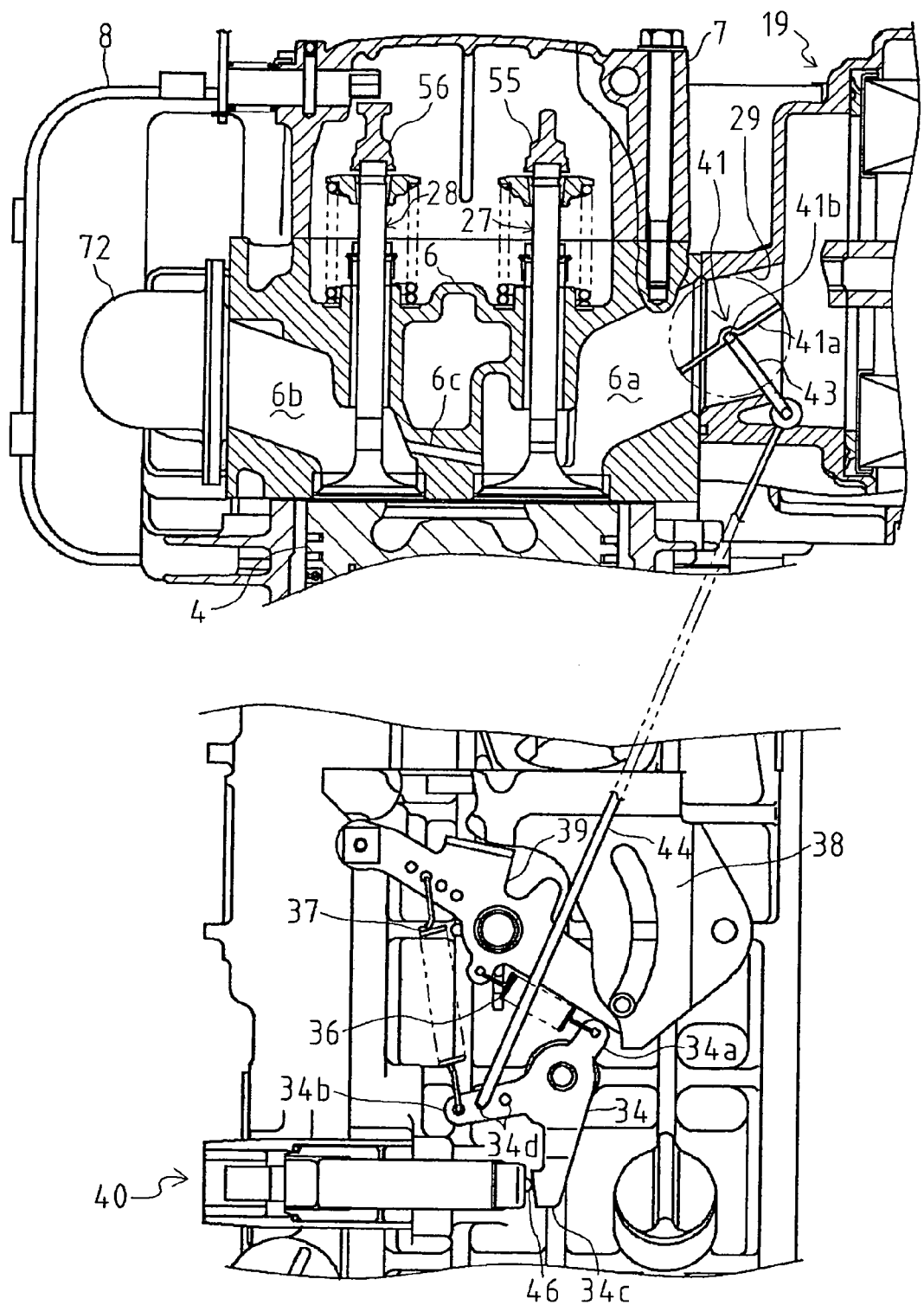
FIG. 7 illustrates a link mechanism between a variable throttle and a limiter lever.

As shown in FIG. 7, in engine 1 having the EGR mechanism, a variable throttle 41 is provided on an intermediate portion of suction flow passage 29 for communicating suction port 6a with air cleaner 19, so that the EGR rate can be changed by adjusting variable throttle 41. Variable throttle 41 of this embodiment incorporates a valve member 41a having a sectional shape which is substantially similar to the sectional shaped of suction flow passage 29, so that suction flow passage 29 is opened and closed by rotating a central portion of valve member 41a around its horizontal (alternatively, perpendicular) axis. Variable throttle 41 is not limitative in configuration. Variable throttle 41 is a butterfly in this embodiment, however, it may be provided with a shutter. The only requirement for variable throttle 41 is to have a valve member which may be rotated or slid for adjusting the opening area of suction flow passage 29.

In variable throttle 41, valve member 41a has a rotary shaft 41b fixed to a link 43.

Link 43 is operatively connected to second arm 34b of control lever 34 via a link 44.

Second arm 34b is provided with a plurality of connection holes 34d disposed at certain intervals. Link 44 is connected at one end thereof to one of connection holes 34d. The length of the linkage can be changed by exchanging connection hole 34d to be connected to connecting link 44, or by interposing a turn buckle or the like between links 43 and 44, thereby changing the timing of controlling the amount of recirculated exhaust gas.

Due to this configuration, variable throttle 41 is automatically opened and closed in correspondence to rotation of control lever 34 so as to adjust the amount of air introduced into suction port 6a, thereby adjusting the EGR rate.

In this regard, when the engine is driven at low speed, control lever 34 is rotated for low speed drive so as to rotate variable throttle 41 in the closed direction. Therefore, the amount of air introduced from air cleaner 19 is reduced and the amount of exhaust gas recirculated via connection hole 6c is increased (The EGR rate becomes high), thereby greatly combusting incompletely combusted material so as to reduce NOx and the like.

When the engine is driven at high speed, the governor device 11 rotates control lever 34 for high speed drive so as to open variable throttle 41. At this time, substantially complete combustion is performed in engine 1 so that a great amount of air is introduced from air cleaner 19, and the exhaust gas recirculated from connection hole 6c is reduced.

In other words, variable throttle 41 can reduce NOx because it is automatically shifted to be closed for increasing the EGR rate during low speed drive, and alternatively to be closed for reducing the EGR rate during high speed drive. Further, the linkage including links 43 and 44 for operatively connecting variable throttle 41 to control lever 34 can be simplified.

This linkage can control the EGR rate to a value nearly synchronous to the engine action in comparison with a later-discussed linkage of variable throttle 41 connected to regulator 39.

Alternatively, variable throttle 41 may be operatively connected not to control lever 34 but to regulator 39 via links 47 and 48.

Figure 8:
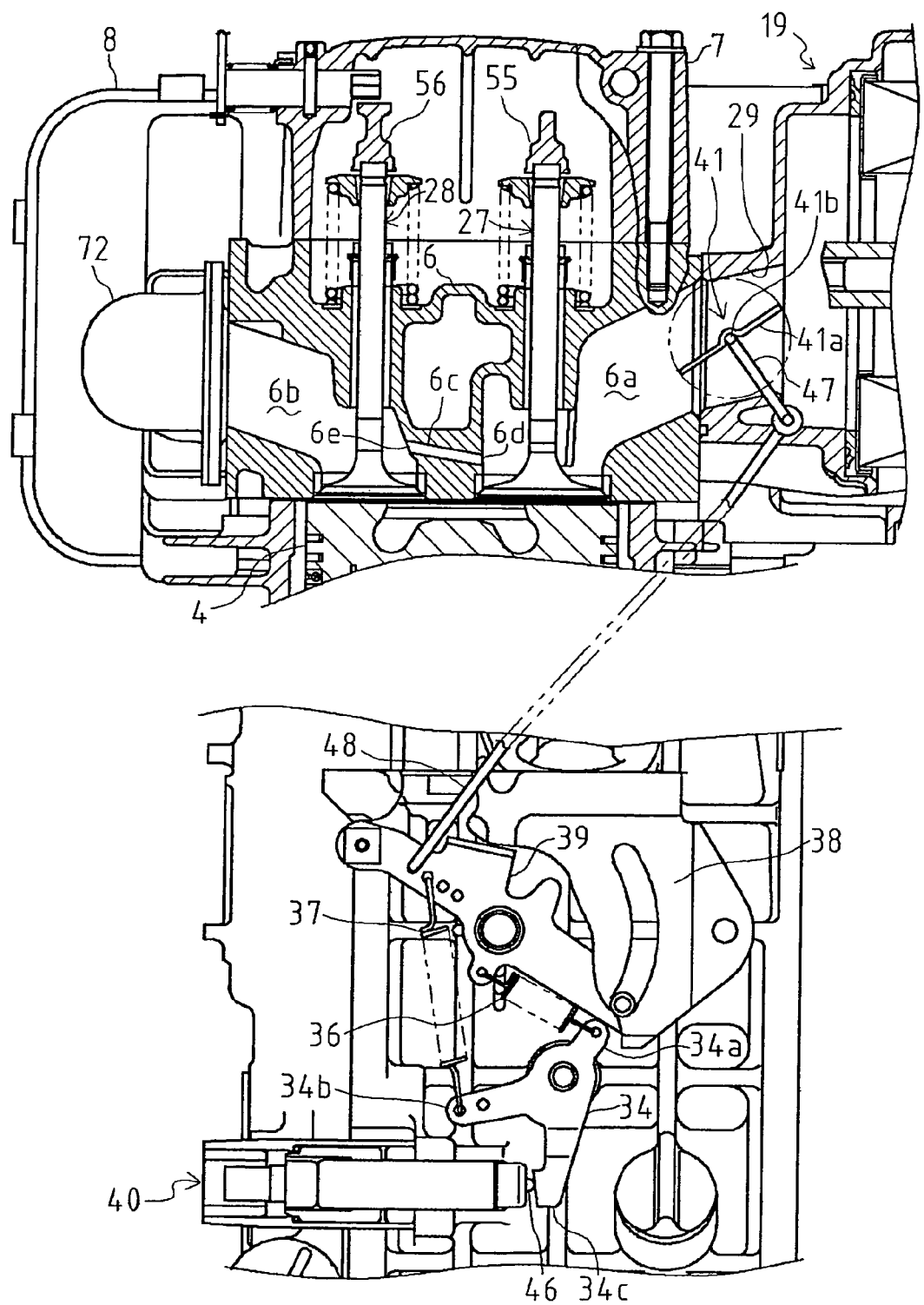
FIG. 8 illustrates a link mechanism between the variable throttle and a control lever.

In this case, as shown in FIG. 8, by rotating regulator 39 to set the rotary speed of engine 1, variable throttle 41 is opened and closed to a position corresponding to the set position via links 47 and 48, so as to adjust the amount of air introduced into suction port 6*a* from air cleaner 19 via suction flow passage 29, thereby adjusting the EGR rate, similar to the above embodiment.

In this regard, variable throttle 41 is rotated to be closed by rotating regulator 39 during low speed setting, and alternatively, variable throttle 41 is opened during high speed setting. Consequently, variable throttle 41 is automatically shifted to be closed to increase the EGR rate during the low speed drive, and to be opened to reduce the EGR rate during the high speed drive, so that NOx can be reduced while keeping the desirable performance of the engine. Further, the linkage including links 47 and 48 for operatively connecting variable throttle 41 to regulator 39 can be simplified.

Figure 9:
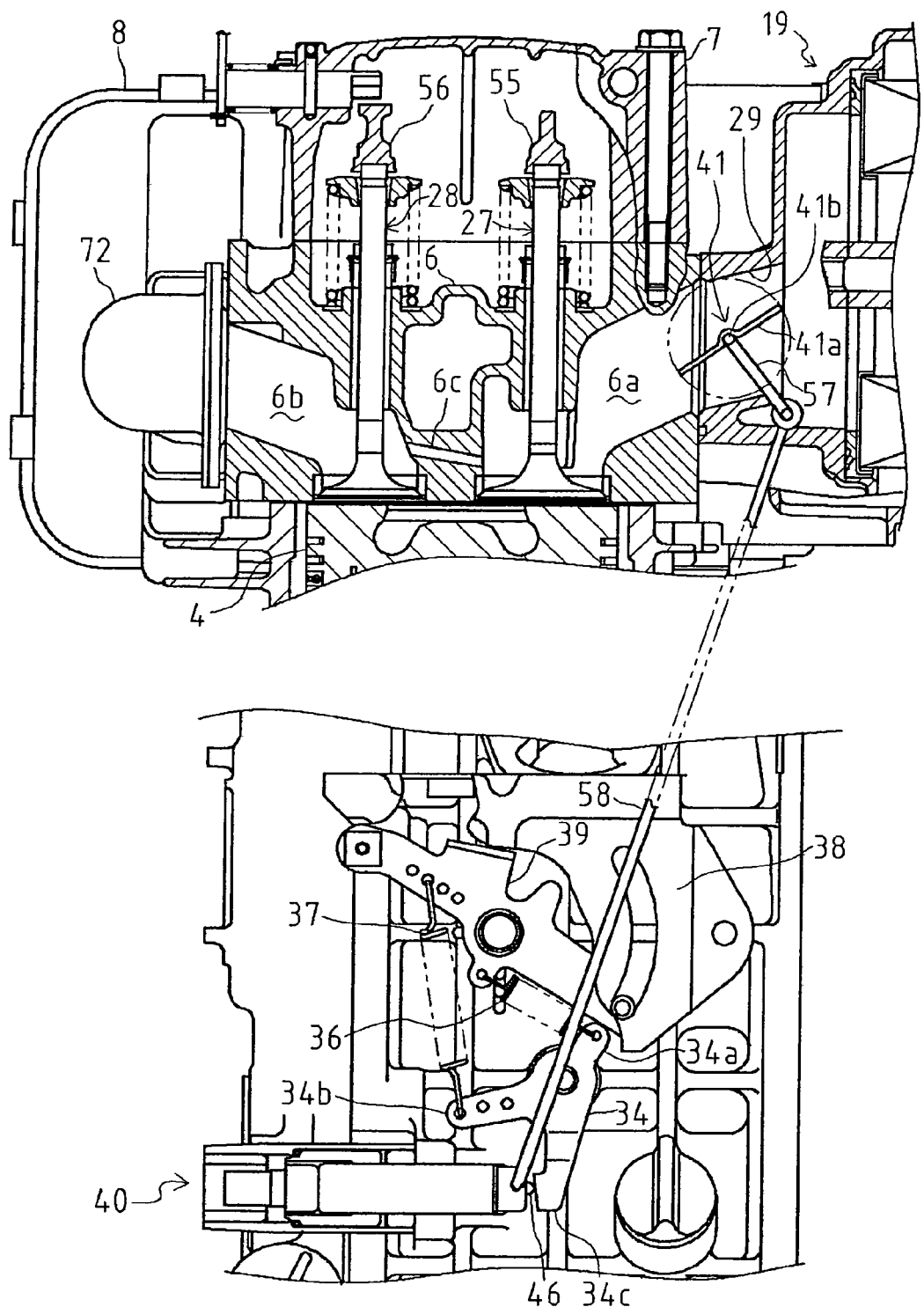
FIG. 9 illustrates a link mechanism between the variable throttle and thermo-sensing expansive member.

Alternatively, variable throttle 41 may be operatively connected to thermo-sensing expansive member 40, as shown in FIG. 9. As mentioned above, thermo-sensing expansive member 40 is expanded in correspondence to the temperature change of engine 1 so as to slidably shift slide shaft 46 for rotating control lever 34. Thermo-sensing expansive member 40 is operatively connected to variable throttle 41 via links 57 and 58 so as to automatically open and close variable throttle 41 for adjusting the EGR rate.

In this regard, thermo-sensing expansive member 40 shifts variable throttle 41 in the closing direction in a low temperature, and alternatively opens variable throttle 41 in a high temperature. Consequently, variable throttle 41 is automatically shifted to be closed for increasing the EGR rate during low speed drive, and to be opened for reducing the EGR rate during high speed drive, so that NOx can be reduced while keeping the desirable performance of the engine. Further alternatively, a thermo-sensing expansive member other than thermo-sensing expansive member 40 may be disposed in exhaust port 6*b* or the like so as to be operatively connected to variable throttle 41 for adjusting the EGR rate.

Figure 10:
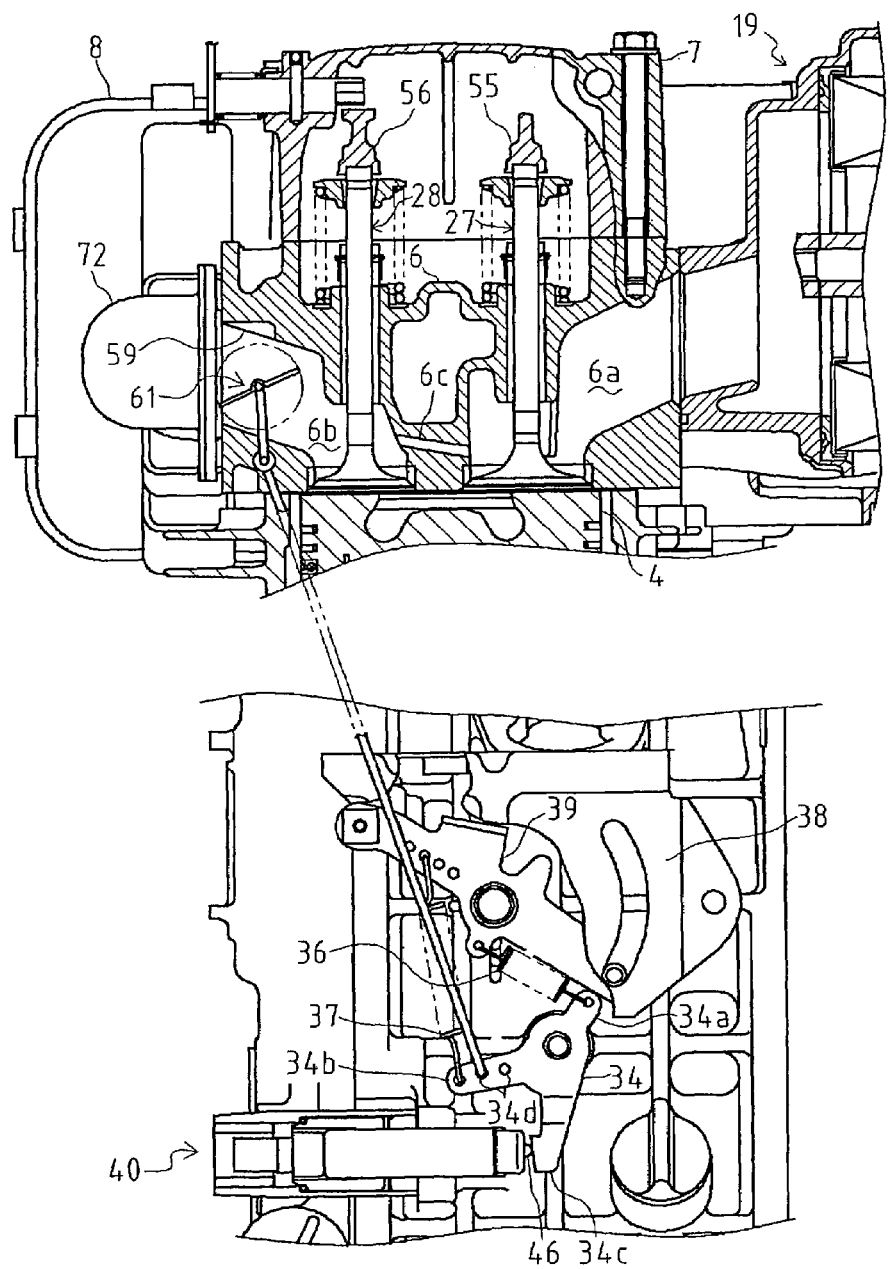
FIG. 10 illustrates a link mechanism between an alternative variable throttle and the limiter lever.
Figure 11:
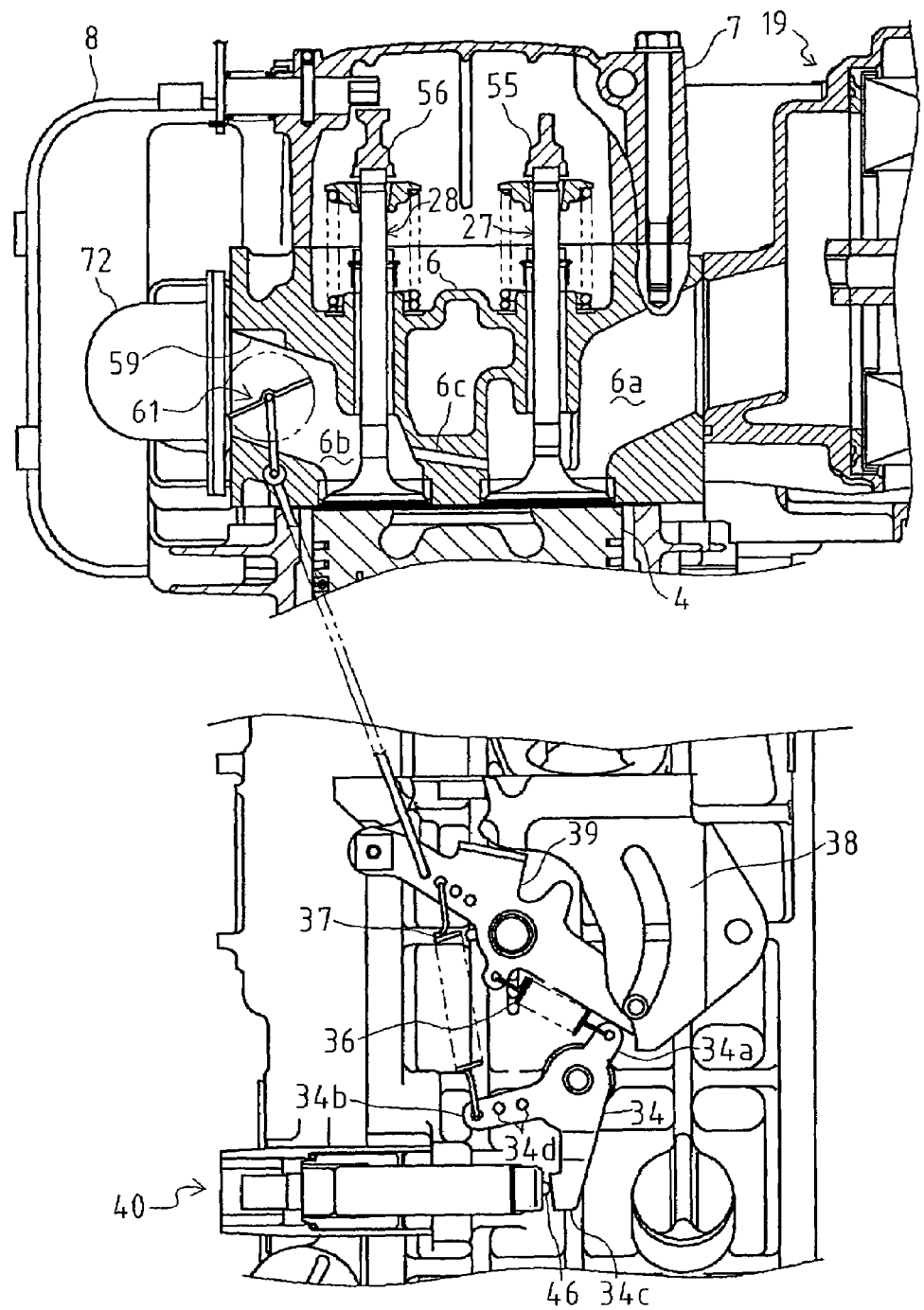
FIG. 11 illustrates a link mechanism between the alternative variable throttle and the control lever.
Figure 12:
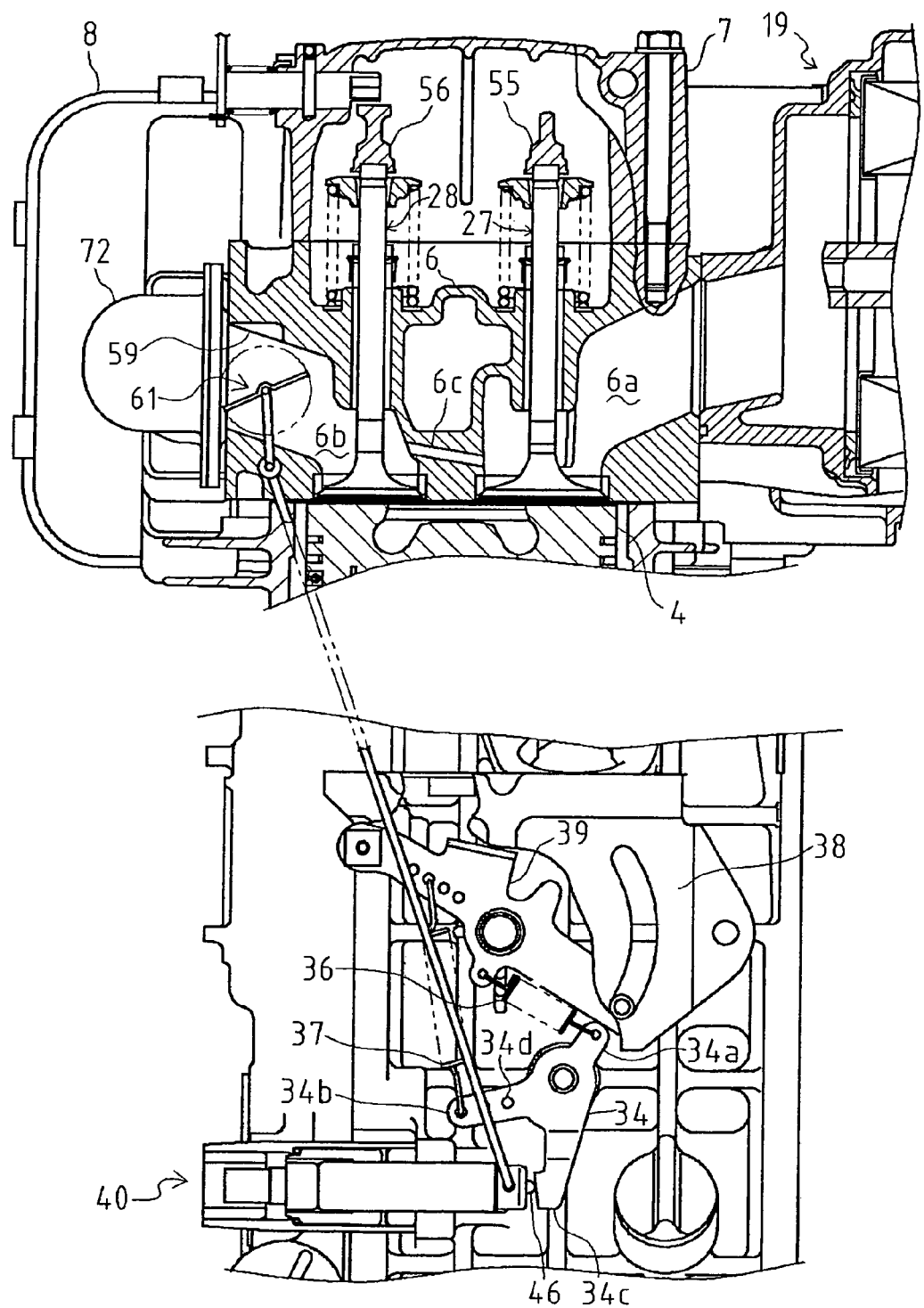
FIG. 12 illustrates a link mechanism between the alternative variable throttle and the thermo-sensing expansive member.

Instead of variable throttle 41 in the intermediate portion of suction flow passage 29, an alternative variable throttle 61 may be disposed in an intermediate portion of exhaust flow passage 59 connecting exhaust port 6*b* to exhaust manifold 72, as shown in FIGS. 10 to 12, so as to be operatively connected to control lever 34, regulator 39, thermo-sensing expansive member 40 or so on, thereby adjusting the EGR rate. Description of linkage for operative connection of variable throttle 61 is omitted because it is substantially similar to the above embodiments.

Figure 13:
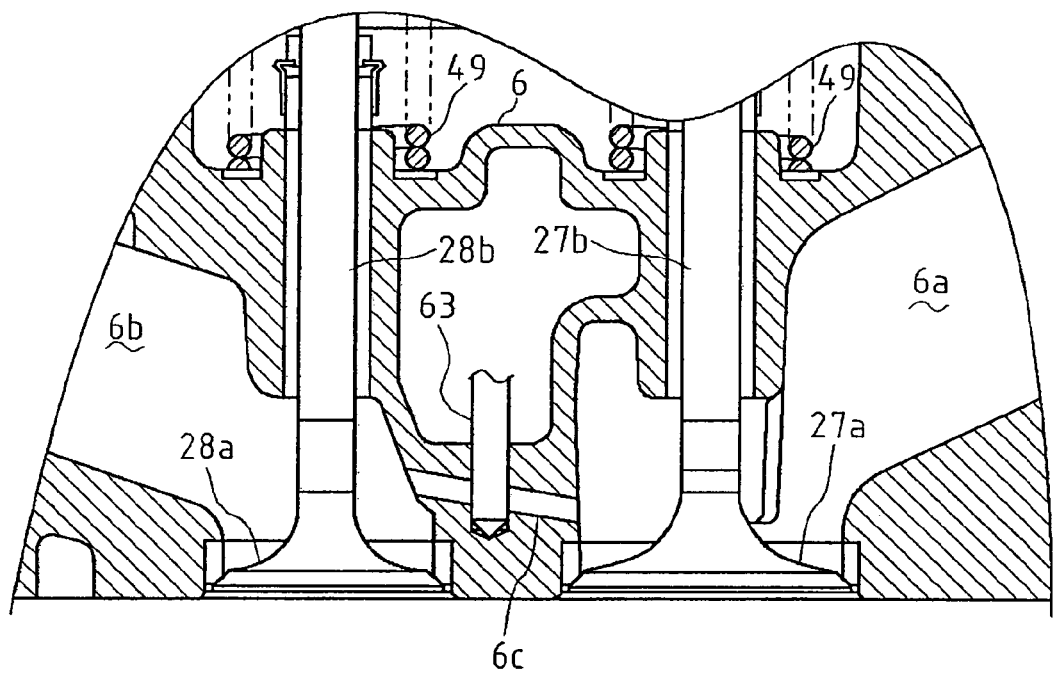
FIG. 13 illustrates a connection hole with opening-and-closing means.

Alternatively, opened-and-closed means may be disposed in an intermediate portion of connection hole 6*c* so as to directly adjust the amount of exhaust gas flowing in connection hole 6*c*, thereby adjusting the EGR rate. For example, a needle valve 63 as shown in FIG. 13 may serve as the opened-and-closed means. Needle valve 63 may have a valve member operatively connected to control lever 34, regulator 39, thermo-sensing expansive member 40 or so on via an unshown linkage so as to adjust the EGR rate, similar to the above embodiments.

INDUSTRIAL APPLICABILITY

As mentioned above, the exhaust gas recirculation device for an engine according to the present invention can have the simple EGR mechanism such as to restrain increase of temperature for combustion of gas, and to reduce NOx. Therefore, the device is industrially applicable.

What is claimed is:

1. An exhaust gas recirculation device for an engine having a cylinder head with a suction port opened to an air suction valve through an air suction valve hole and with an exhaust port opened to an air exhaust valve through an air exhaust valve hole, provided with a mechanism for recirculating a portion of exhaust gas to the suction side of the cylinder head, characterized in that a connection hole is bored slantwise through a wall of the cylinder head disposed between the suction port and the exhaust port so as to cross a phantom line between centers of the air suction and exhaust valves so that an end of the connection hole opened to the air suction valve hole is disposed along the direction of swirls of sucked air.

2. The exhaust gas recirculation device for an engine according to claim 1, wherein the connection hole is bored vertically slantwise.

3. The exhaust gas restriction device for an engine according to claim 1, wherein the connection hole has a centerline disposed on the tangent direction of the air suction valve hole.

4. The exhaust gas recirculation device for an engine according to claim 1, wherein a throttle is disposed in a suction flow passage communicating with the suction port so that the opening area of the suction flow passage can be adjusted by the throttle.

5. The exhaust gas recirculation device for an engine according to claim 4, wherein the throttle is operatively connected to a control lever of a fuel injection pump for adjusting the amount of injected fuel.

6. The exhaust gas recirculation device for an engine according to claim 4, wherein the throttle is operatively connected to a regulator.

7. The exhaust gas recirculation device for an engine according to claim 4, wherein the throttle is operatively connected to a thermo-sensing expansive member which is expanded and contracted in correspondence to engine temperature.

8. The exhaust gas restriction device for an engine according to claim 1, wherein a throttle is disposed in an exhaust flow passage communicating with the exhaust port so that the opening area of the exhaust flow passage can be adjusted by the throttle.

9. The exhaust gas recirculation device for an engine according to claim 1, wherein the connection hole has a portion at the suction side and a portion at the exhaust side which have diameters that are different from each other.

10. The exhaust gas recirculation device for an engine according to claim 1, wherein opened-and-closed means is disposed in an intermediate portion of the connection hole so as to adjust the opening area of the connection hole.

11. An exhaust gas recirculation device for an engine having a cylinder head with a suction port and an exhaust port, provided with a mechanism for recirculating a portion of exhaust gas to the suction side of the cylinder head, characterized in that a connection hole is opened through a wall of the cylinder head disposed between the suction port and the exhaust port, wherein a throttle is disposed in an exhaust flow passage communicating with the exhaust port so that the opening area of the exhaust flow passage can be adjusted by the throttle, characterized in that the throttle is operatively connected to a control lever of a fuel injection pump for adjusting the amount of injected fuel.

12. An exhaust gas recirculation device for an engine having a cylinder head with a suction port and an exhaust port, provided with a mechanism for recirculating a portion of exhaust gas to the suction side of the cylinder head, characterized in that a connection hole is opened through a wall of the cylinder head disposed between the suction port and the exhaust port, wherein a throttle is disposed in an exhaust flow passage communicating with the exhaust port so that the opening area of the exhaust flow passage can be adjusted by the throttle, characterized in that the throttle is operatively connected to a thermo-sensing expansive member which is expanded and contracted in correspondence to engine temperature.

* * * * *